INVENTOR
FREDERIC FUA
ROBERT C. WOODS
BY John J Rogan
ATTORNEY

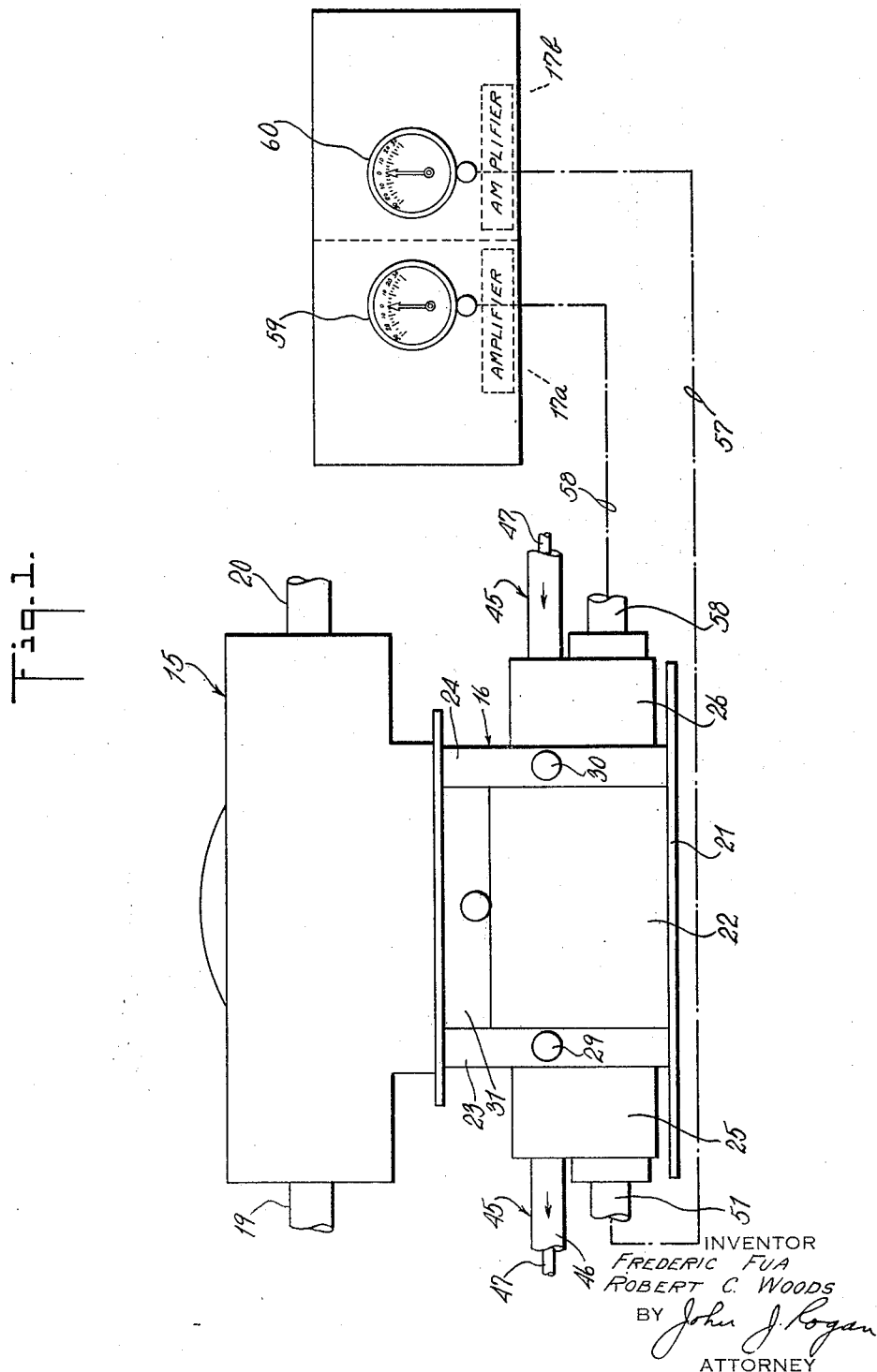

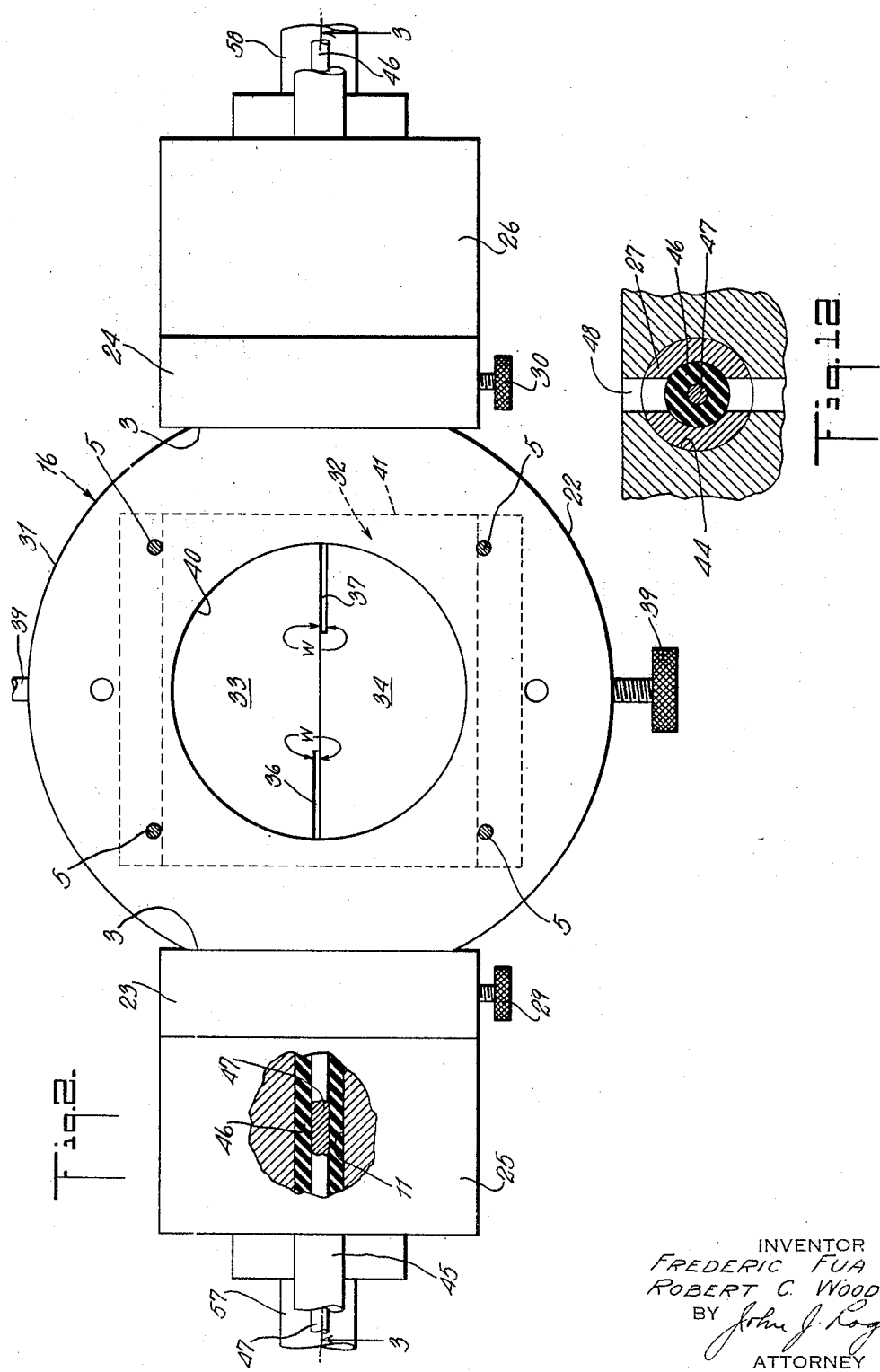

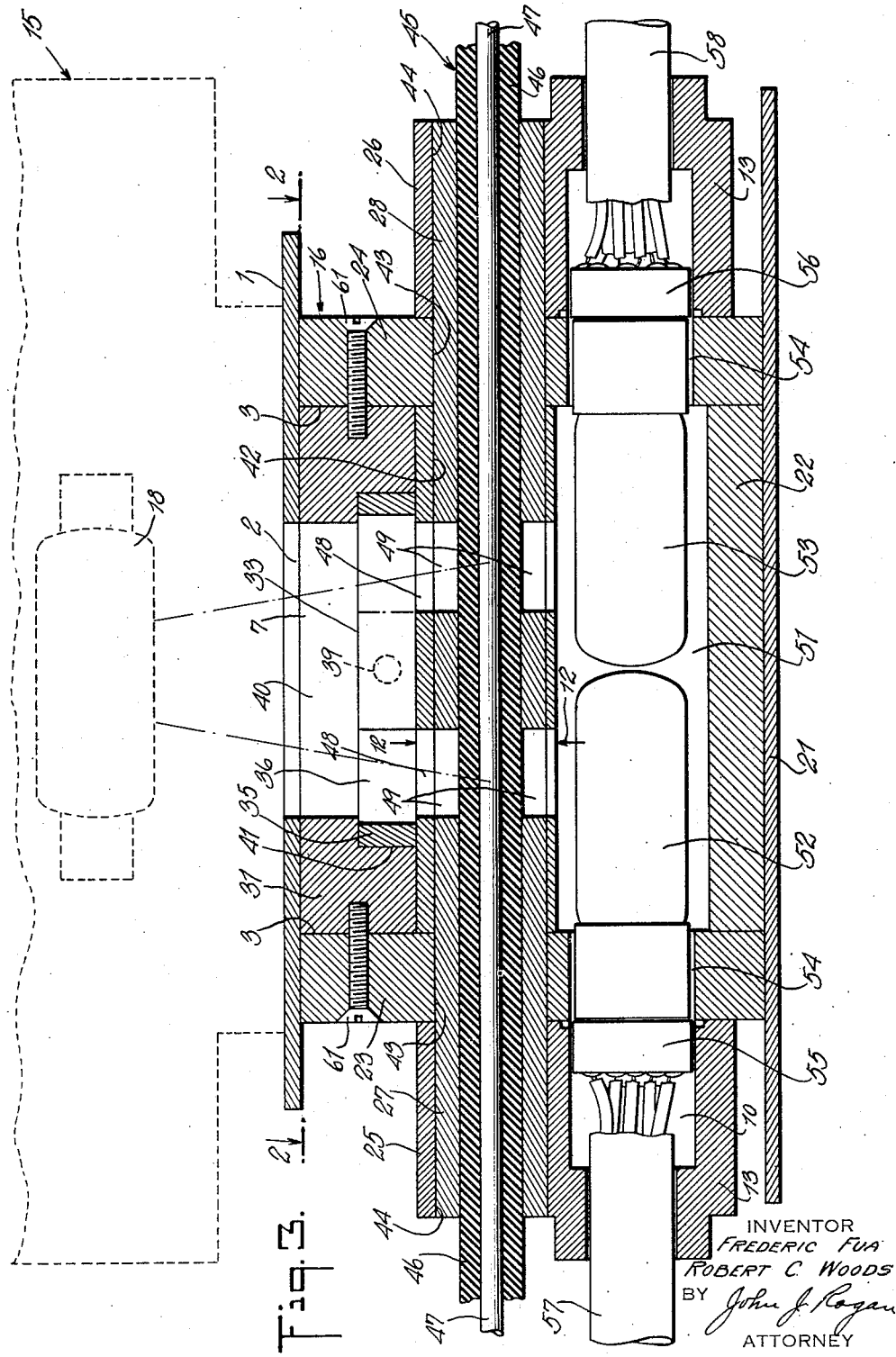

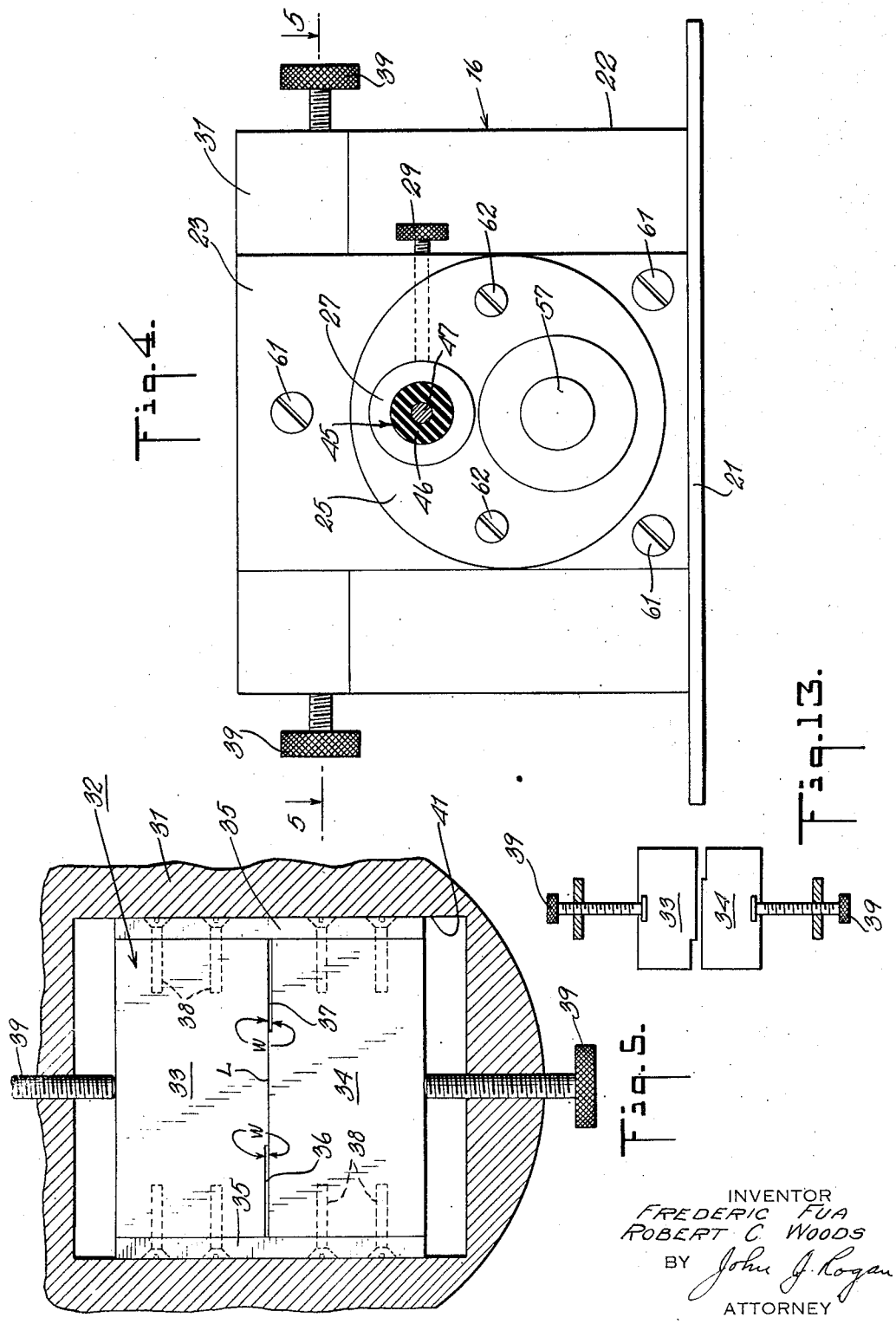

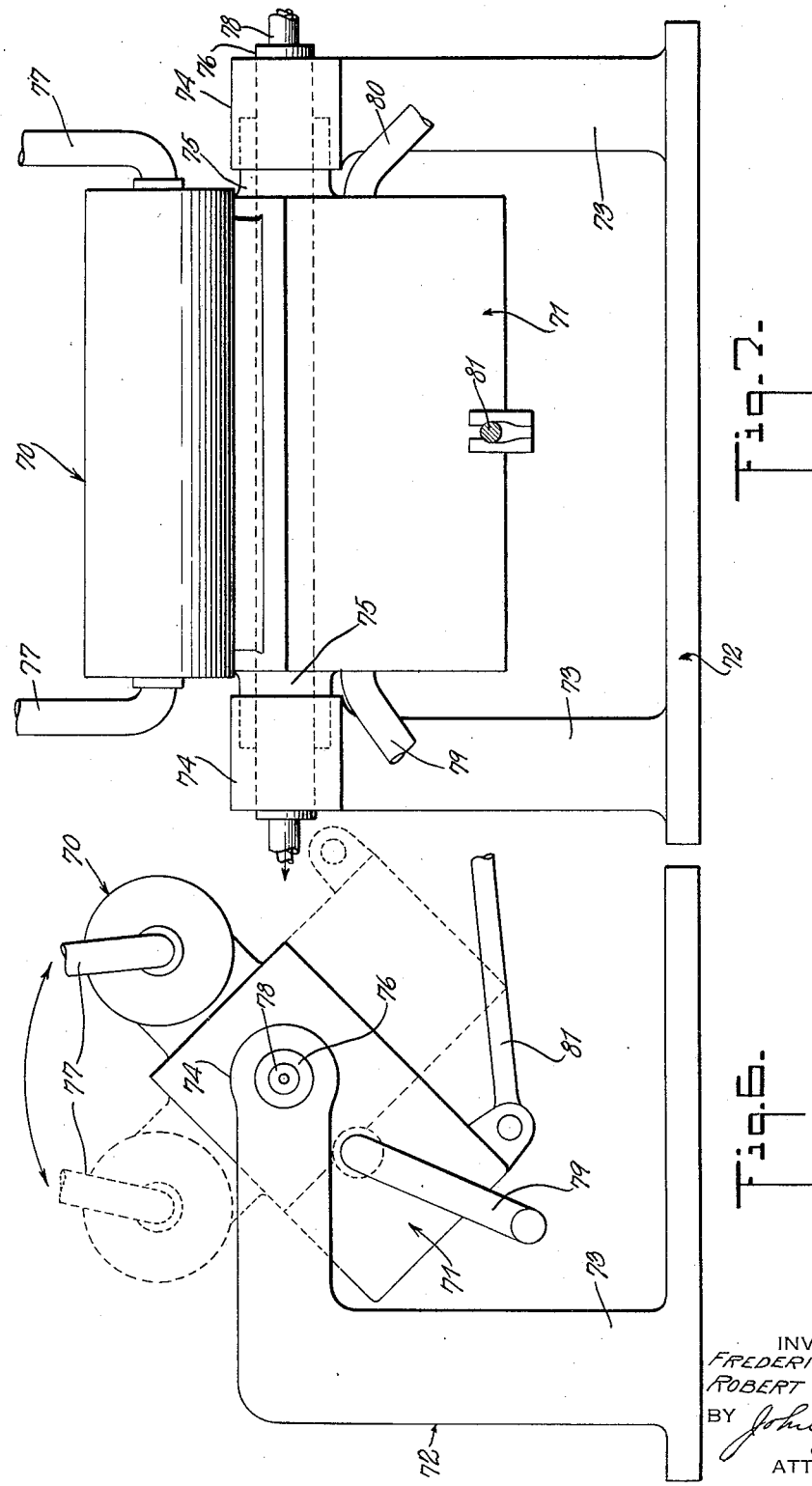

Oct. 10, 1950     F. FUA ET AL     2,525,292
MEASURING AND TESTING METHOD AND
APPARATUS EMPLOYING X-RAYS
Filed Oct. 16, 1944     7 Sheets-Sheet 7
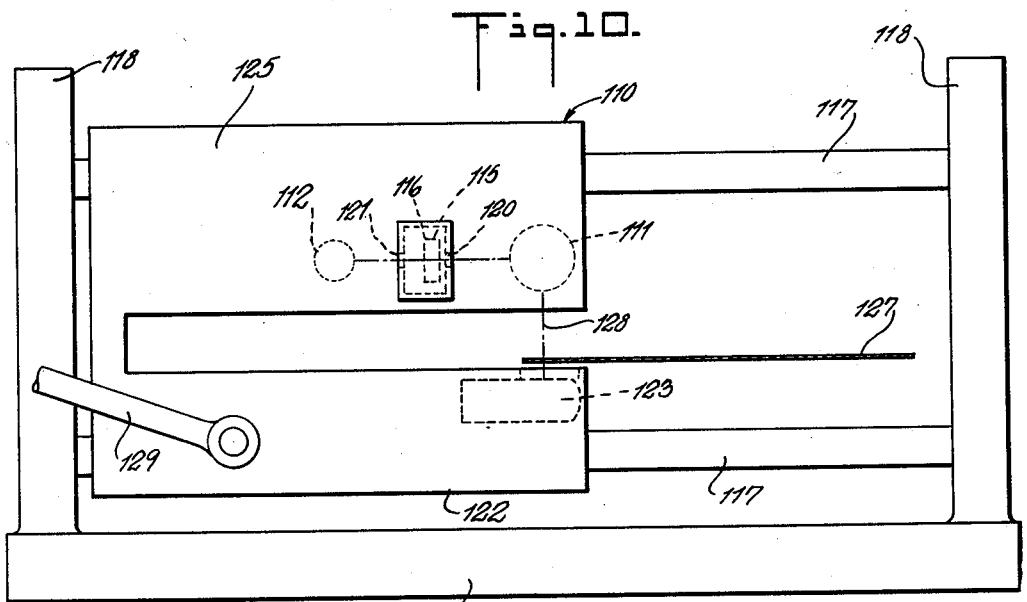
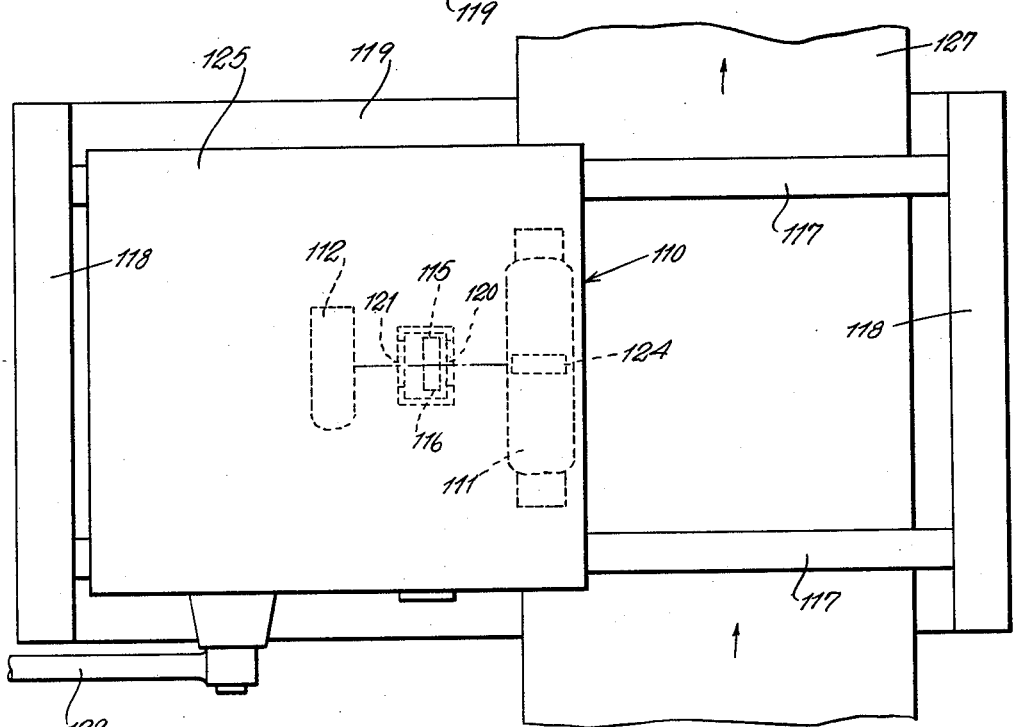
INVENTOR
FREDERIC FUA
ROBERT C. WOODS
BY John J. Rogan
ATTORNEY Patented Oct. 10, 1950

2,525,292

UNITED STATES PATENT OFFICE 2,525,292

MEASURING AND TESTING METHOD AND APPARATUS EMPLOYING X RAYS

Frederic Fua, New York, N. Y., and Robert C. Woods, Montclair, N. J., assignors to Standard Electronic Research Corporation, New York, N. Y., a corporation of New York Application October 16, 1944, Serial No. 558,928

11 Claims. (Cl. 250—83.3)

This invention relates to measuring and testing apparatus, and more particularly to methods and apparatus for examination of materials by X-rays or similar penetrating radiations.

A principal object of the invention relates to an X-ray testing device which is capable of ascertaining the internal physical condition of various articles.

Another object relates to an X-ray testing device which is useful in the continuous testing or checking of one or more physical characteristics of a moving object, such for example as an insulated cable as it leaves the cable insulation sheathing machine.

Another object is to provide an improved X-ray method and apparatus for testing the thickness or other physical properties of a continuously moving fragile web, such as a metal foil, without a physical contact therewith.

In certain of the arts, for example in the manufacture of insulated conductors, it is of extreme importance that the cable or metallic conductor be sheathed uniformly with insulation. That is to say, the insulation thickness should in most cases be uniformly distributed around the periphery of the conductor. Thus in the case of a single conductor cable, the conductor should be located concentrically with respect to the insulation sheath throughout its entire length. In certain processes of sheathing the wire with insulation, the insulation is extruded or forced through a suitable die or gate through which the cable conductor wire is simultaneously fed. Notwithstanding the most elaborate precautions to maintain the extruding mechanism clean and accurate, it very frequently happens that the insulation is not always uniformly distributed around the wire. If the insulation is in plastic condition during the extrusion, and if the extrusion gate or die becomes clogged at one or more points, there is a tendency for the plastic insulation to accumulate in a localized region within the die. This results in a non-uniform pressure which tends to offset the wire and insulation sheath with respect to each other. The net result is that the cable conductor tends to assume a non-concentric relation within the insulating sheath. This condition is cumulative, so that after a certain extent of run, the cable conductor is too much eccentric with respect to the insulation sheath to provide satisfactory protection against breakdown at one or more sections of the cable. Heretofore, this abnormal condition could not be ascertained during the insulating process without stopping the machine at frequent intervals to examine samples of the sheathed conductor. Furthermore, it was not possible to keep a continuous check on the concentricity or lack of concentricity between the conductor and its sheath. Accordingly, it is a principal object of this invention to provide a device whereby such a continuous check can be kept on the relation between a metallic conductor and its enclosing sheath.

Another feature of the invention relates to a compact X-ray testing device which can be installed directly adjacent the exit end of a wire insulating machine, to determine continuously and instantaneously any offsetting of the conductor with respect to the insulation.

Another feature relates to an improved X-ray testing head for examining insulated electric conductors whereby the insulation can be tested without subjecting the cable to deformation or excessive rubbing.

A further feature relates to an X-ray testing head for insulated electric conductors whereby the conductor itself acts as part of a special X-ray slit system, to determine concentricity or lack of concentricity between the conductor and its surrounding insulation sheath.

A further feature relates to a specially constructed X-ray testing head for examining insulated cables and the like, which is safe and reliable in operation.

A further feature relates to an X-ray device for testing insulated conductors to determine the direction and extent of any offsetting of the conductor within its insulating sheath.

Another feature relates to an X-ray device for testing the thickness of materials such as metal foil webs, whereby greater sensitivity in testing thickness or density variations is attained.

A further feature relates to an X-ray testing device for testing variations in thickness or density across the width of a moving metal web, such for example as a continuously moving metal foil.

A still further feature relates to the novel organization, arrangement and relative location of parts which cooperate to produce a compact, safe and reliable X-ray testing device of the character to be described.

Other features and advantages not specifically enumerated will be apparent after a consideration of the following detailed descriptions and the appended claims.

While the invention will be described in connection with the testing of insulated wires, metal foil and the like, it will be understood that in certain of its aspects, the invention is equally well applicable to the testing of a wide variety of articles. Therefore in the drawing, Fig. 1 is a side elevation of a cable testing head and X-ray unit according to the invention.

Fig. 2 is a sectional plan view of Fig. 3, taken along lines 2—2 thereof, viewed in the direction of the arrows.

Fig. 3 is a sectional view of Fig. 2, taken along lines 3—3.

Fig. 4 is a left-hand end view of Fig. 2.

Fig. 5 is a partial plan sectional view of Fig. 4, taken along lines 5—5 thereof.

Fig. 6 is an end view of a modification of Figs. 1 to 5.

Fig. 7 is a side elevation view of Fig. 6.

Fig. 10 is an end view of a modification of Figs. 8 and 9.

Fig. 11 is a top-plan view of Fig. 10.

Fig. 12 is a sectional view of Fig. 3 taken along line 12—12 thereof.

Fig. 13 is a modified form of adjustable slit unit according to the invention.

Figure 8:
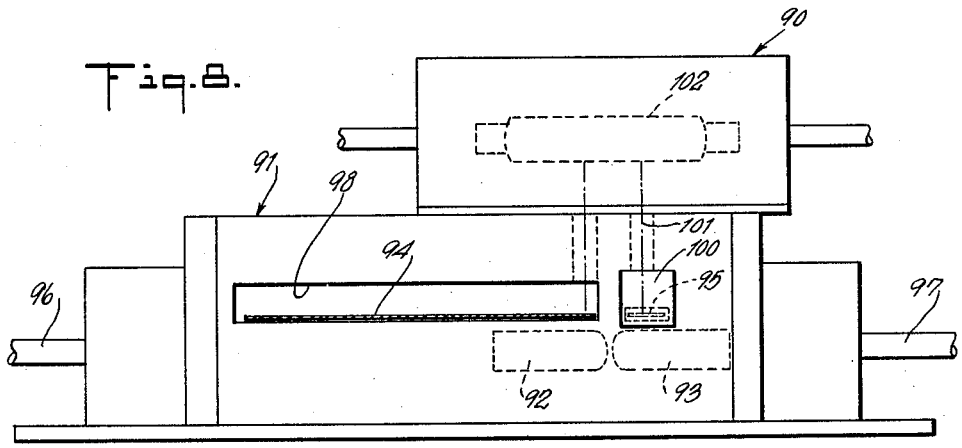
Fig. 8 is an end view of a modification for testing the edge of metal webs.

Referring to Figs. 1 to 5, the device consists in general of two units 15, 16, the unit 15 comprising a suitable metal housing for the X-ray generator tube 18 and its associated components. Housing 15 can be completely closed except for the bottom wall which has a suitable window for the X-ray beam. Unit 15 is adapted to rest on the top cover plate 1 of unit 16 to which it may be removably fastened. Housing 15 is provided on its interior with suitable supports for the X-ray tube and its accessories all of which are well-known in the X-ray art, the electric power supply for the X-ray tube being provided through conductors 19, 20. The window in the bottom of housing 15 is arranged to register with a corresponding window 2 in the plate 1. When the two windows are in proper registry, the housing may be fastened in place.

The unit 16 comprises a main body section 22 which may be in the form of a circular casting having flat end walls 3 to which corresponding rectangular metal blocks 23, 24, are fastened as by screws 61. Fastened by screws 5 to the upper face of member 22 is another casting 31 having a central circular window 40 which registers with window 2. The casting 31 also has on its lower side a rectangular opening 41, which is slightly larger than the circular window to form a flat shoulder 8 which with the flat upper face of member 22, provides parallel channels or guides for the adjustable slit unit 32.

As shown in Fig. 5, the slit unit 32 comprises a pair of side bars 35 between which are fastened two flat metal blocks 33, 34, by means of screws 38. Each of the blocks 33, 34, is provided with a notched or cut away portion at one end so that when the blocks are fastened in abutting relation as shown in Fig. 5, they define two separate slits 36, 37, which are staggered symmetrically on opposite sides of the center line L between the blocks. The notches are of such dimensions that each has a width WW which is substantially equal to the radius of the metal conductor or conductor group 47 in the cable 45 to be tested, the insulation covering or sheath of which is indicated by the numeral 46. The slit unit 32 is slidable for adjusting the slits 36, 37, laterally with respect to the center line L so that the slits can be aligned vertically with the central longitudinal axis of the cable wire 47. For this purpose, adjustable stop screws 39 are threaded diametrically opposite to each other through the wall of member 31.

Fastened by screws 62 to the flat outer faces of blocks 23 and 24, are two circular headers 25, 26, each having circular bores 10, 11, in alignment with corresponding circular bores in the blocks 23, 24. Likewise, member 22 has a pair of transverse circular bores 42 and 51, which are in alignment with the respective bores in members 23, 24, 25, 26. The upper wall of member 22 is provided with a pair of through openings or windows 48, with which the slits 36, 37 are adapted to register in a vertical direction (Fig. 3). Thus when there is no cable passing through the device, there are a pair of unobstructed paths for the X-rays through the opening 2, thence through slits 36, 37, thence through openings 48 into the bore or chamber 51. However, in order to guide the cable through the device for testing and to insure that it remains in a fixed longitudinal orientation with respect to the openings 48, there is provided a removable hollow mandrel which may be made in two sections 27, 28, although preferably a single length mandrel is employed. The mandrel extends completely through members 22—26. The mandrel is provided with diametric opposite windows or openings 49, which are arranged to register with openings 48. When the mandrel openings are in the proper registry, the mandrel can be locked in place by a pair of externally adjustable set screws 29, 30.

Arranged to pass through the openings 54 in members 23, 24, are a pair of light sensitive or photo-electric cells 52, 53, of any well-known construction, preferably of the type having a photo electron-emissive cathode and one or more electron collecting electrodes or anodes. For example cells which are sold under the trade designation RCA 929, may be used. The cells are mounted so that each has its photo-sensitive electrode in alignment with the corresponding slits 36, 37. Consequently, each cell will respond only to the X-ray beam passing through the corresponding slit 36 or 37. The cells may be plugged into respective contact headers or sockets 55, 56, of any well-known construction, the connecting wires to which are brought out in a common cable 57 or 58. The sockets 55, 56, may be fastened to form a unit with the respective members 13, so that when the later members are fastened by appropriate screws to clamps to the blocks 22, 23, the cells are correctly connected in circuit and in proper location within chamber 51.

As shown schematically in Fig. 1, each cell is connected to its respective amplifier 17A or 17B, each of which in turn controls a respective indicating device or meter 59, 60. The entire testing unit can be fastened to a suitable common support or table, while the amplifier and indicating equipment may be located at any suitable place.

In using the device to test a cable 45 for offsetting of the wire 47, the slit and amplifier systems are preferably initially adjusted by using a short length of standard cable which can be inserted through the mandrel. Therefore, the central conductor of the standard is located on the center line of the various windows 48, 49, it being understood that the mandrel has previously been properly adjusted so that the windows 48, 49, are in alignment. The slit unit 32 is then adjusted by screws 39 until the center line L (Fig. 3) is in vertical alignment with the center of windows 48. This alignment can be effected either by visual examination or by special aligning gauges. The X-ray and amplifier units are then switched into operation and the slit unit 32 is again adjusted until both meters 59, 60, read alike. Their setting will then correspond to a perfect concentricity of the cable conductor within its insulating sheath. It should be observed that the radius of wire 47 of the standard cable is approximately the same dimension as the width of each of the slits 36, 37, so that when the parts are properly adjusted the cable wire acts as a mask, one half of the wire thickness masking the cell 52 from the X-rays, and the other half of the wire thickness masking the cell 53 from the X-rays. It will be understood that the invention is not limited to a complete masking of the respective cells by the corresponding half of the wire, as it will be clear that a zero or normal reading on the indicators 59, 60, can be obtained even if the wire does not entirely mask the slit. In other words with a standard cable in the device, the zero setting of indicators 59, 60, may be noted so that when a cable to be tested is passed through the mandrel, any departure from the standard conditions within the cable can be immediately observed.

Because of the symmetrical disposition of the slits 36, 37, on either side of the central longitudinal axis of the cable, if the cable under test has an abnormal condition wherein the wire is offset from the center, a particular one of the slits 36, 37, will be completely or materially uncovered to cause the corresponding indicator to move to an off normal position. It will be understood that the device may be provided with sets of slit units of different slit widths for use in testing cables of different wire size. Likewise, different mandrels having the same outside diameter, but of different inside diameter, may be used for cables of different overall diameter.

Instead of using different slit units for testing different size wire cables and with the members 33, 34, fastened together as a unit, each of these members 33, 34 may be adjustable towards and away from each other to vary the widths of the slits in accordance with the size of the cable wire being tested. Such an arrangement is schematically illustrated in Fig. 13.

In the foregoing embodiment the indications will be given when the wire is offset laterally with respect to the central longitudinal axis of the cable. If it is desired to examine the wire for offsets at different angles, a duplicate testing unit may be provided through which the cable also passes, but with the various slits and the X-ray beam located at right angles to the position of the beam and slits as illustrated in the embodiment of Fig. 3.

As a modification, the device already described instead of being mounted on a fixed base or table, may be mounted for rotation around the cable while the latter is being fed through the device for testing. Such an arrangement is shown in Figs. 6 and 7. In this embodiment, the X-ray generator unit 70 and the slit-light cell unit 71 are the same as those already described and are fastened together as an assembly. This assembly is suitably supported on a rotatable frame which is provided with tubular extensions 75, which may be fastened in any suitable manner to the extended ends of the mandrel 76. The ends of the mandrel 76 are rotatably supported in journals 74 carried by uprights 73 attached to the table 72. By means of a suitable lever 81 attached to the assembly, the latter may be rotated in unison around the cable 78 to any desired angle. It will be understood of course that the connecting leads 77 for the X-ray unit 70, and the connecting leads 79 for the light cell unit 71 are sufficiently flexible to allow turning of the assembly through the desired angle without disturbing the electrical connections and without interfering with the feeding of the cable. By means of a suitable dial, the particular angular setting of the assembly can be determined. Since structurally and electrically the units 70 and 71 are the same as those already described, the manner of adjusting the slits, and also the indicator units which are connected to cables 79 and 80, and their method of use are the same as already described.

Figure 9:
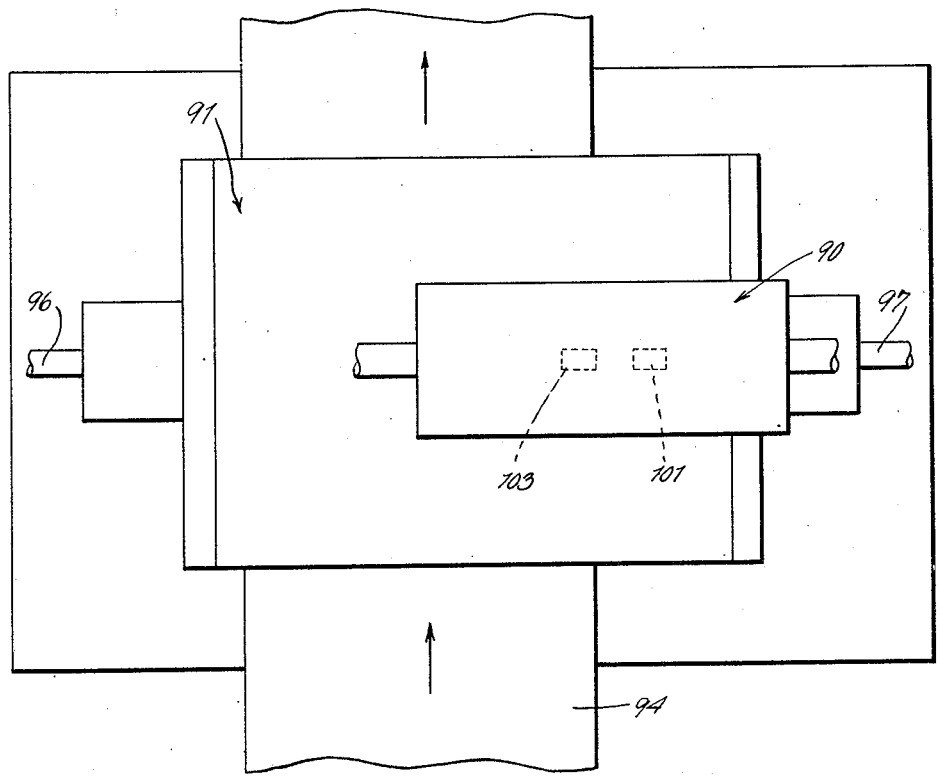
Fig. 9 is a top-plan view of Fig. 8.

Referring to Figs. 8 and 9, there is shown an arrangement for testing the thickness or density of continuously moving webs such as metal foil webs. The device comprises a metal housing 91 having a rectangular bore 98 extending entirely through its length and through which the metal web 94 to be tested is continuously fed. The housing 91 also has a cavity 100 in which is placed a standard sample 95 of the metal foil of known thickness and density. Communicating with the cavity 100 is a slit 101 through which the X-rays from the X-ray tube 102 pass. Likewise a slit 103 communicates with the bore 98 but adjacent one side only of the bore so that the X-rays impinge only on the longitudinal edge of the web 94. Mounted in a suitable cavity beneath the bore 98 and beneath the cavity 95 are a pair of photo-electric cells 92, 93. These cells are mounted so that cell 92 responds only to the X-rays which pass through the edge of the web 94; while the cell 93 responds only to the X-rays which pass through the standard 95. Each of the cells 92, 93 is connected over conductors 96, 97 to its respective amplifier as in Fig. 1, to operate a corresponding meter or indicator. By confining the examination to the longitudinal edge of the web 94, greater sensitivity is obtained in the measurement of the web thickness or density. If the entire width of the web were subjected to the X-rays there would be an averaging effect over the entire width and local minor changes in thickness or density might give an improper indication of the actual thickness of the web.

Referring to Figs. 10 and 11, there is shown a device for measuring the density or thickness at any particular point or points across the width of the web while the latter is being fed continuously in the direction of its length. The device comprises a base 119 having a pair of parallel uprights 118 between which a pair of guide bars 117 extend. Adapted to slide along the bars 117 is a metal housing 110 containing on its interior an X-ray generator tube 111, a light-sensitive or photo-electric cell 112 and a receptacle 115 containing a standard sample 116 of known thickness and density. It will be understood of course that suitable slits 120, 121 are provided between the X-ray tube 111 and the photo-electric cell 112. The housing 110 also has a section 122 within which is enclosed another photo-electric cell 123 which is provided with a slit member 124 so that the X-rays from tube 111 also pass through said slit to the cell 123. The sections 122 and 125 of the housing 110 have a reentrant clear portion 126 and the metal foil or web 127 to be examined is supported on suitable guides (not shown) so as to be fed in a plane perpendicular to the X-ray beam 128. When it is desired to test only the edge section of the web 127, the entire unit 110 is held in the position shown in Fig. 10. If, however, it is desired to examine any particular section of the width of the web 127 while the latter is being fed in the direction of the arrows, the entire unit 110 is moved towards the right, under control of a suitable lever 129.

While certain particular embodiments have been disclosed herein, it will be understood that various changes and modifications may be made therein without departing from the spirit and scope of the invention. It will be understood that the X-rays are chosen as to hardness or penetrating power so that very little, if any, can escape through the metal walls of the various housings and castings, which are preferably of brass, or some other equivalent metal or alloy.

What is claimed is:

1. Apparatus for detecting symmetry or lack of symmetry of location of the conductor of a sheathed cable with respect to its enclosing sheath including, in combination, a body member provided with a bore through which the sheathed cable can be moved axially, said bore being of a diameter appropriate to hold the sheathed cable coaxial therewith, a pair of slits intersecting said bore, said slits being symmetrically disposed on opposite sides of the axis of said bore, a source of X-ray arranged at one side of said body member and disposed so that said slits serve as passageways for two separate X-ray beams through said bore, a pair of X-ray responsive detectors located on the opposite side of said body member from said X-ray source and corresponding to said slits, said detectors being arranged to be separately excited in response to the X-ray traversing their respective slits, and means for comparing the response of said detectors.

2. Apparatus for detecting symmetry or lack of symmetry of location of the conductor of a sheathed cable with respect to its enclosing sheath including, in combination, a body member provided with a bore through which the sheathed cable can be moved axially, said bore being of a diameter appropriate to hold the sheathed cable coaxial therewith, a pair of slits intersecting said bore, said slits being symmetrically disposed on opposite sides of and with one edge coincident with the axis of said bore and staggered along said axis, a source of X-ray arranged at one side of said body member and disposed so that said slits serve as passageways for two separate X-ray beams through said bore, a pair of X-ray responsive detectors located on the opposite side of said body member from said X-ray source and corresponding to said slits, said detectors being arranged to be separately excited in response to the X-ray traversing their respective slits, and means for comparing the response of said detectors.

3. Apparatus for detecting symmetry or lack of symmetry of location of the conductor of a sheathed cable with respect to its enclosing sheath including, in combination, a body member provided with a bore through which the sheathed cable can be moved axially, said bore being of a diameter appropriate to hold the sheathed cable coaxial therewith, a pair of slits intersecting said bore, said slits being symmetrically disposed on opposite sides of the axis of said bore, the combined sheath of said slits transverse to said axis being substantially the width of the conductor of the cable under examination, a source of X-ray arranged at one side of said body member and disposed so that said slits serve as passageways for two separate X-ray beams through said bore, a pair of X-ray responsive detectors located on the opposite side of said body member from said X-ray source and corresponding to said slits, said detectors being arranged to be separately excited in response to the X-ray traversing their respective slits, and means for comparing the response of said detectors.

4. Apparatus for detecting symmetry or lack of symmetry of location of the conductor of a sheathed cable with respect to its enclosing sheath including, in combination, a body member provided with a bore, a hollow cable-receiving mandrel passing through said bore through which the sheathed cable can be moved axially, said mandrel being of an inside diameter appropriate to hold the sheathed cable coaxial therewith, a slit unit mounted in said member and intersecting said bore, said unit having a pair of slits symmetrically disposed on opposite sides of the axis of said bore, opponents in the wall of said mandrel corresponding with said slits, a source of X-ray arranged at one side of said body member and disposed so that said slits serve as passageways for two separate X-ray beams through said bore, a pair of X-ray responsive detectors located on the opposite side of said body member from said X-ray source and corresponding to said slits, said detectors being arranged to be separately excited in response to the X-ray traversing their respective slits, and means for comparing the response of said detectors.

5. Apparatus according to claim 4 in which the slit unit is provided with means to adjust said unit with respect to the mandrel accurately to locate its slits symmetrically on opposite sides of the mandrel axis.

6. Apparatus according to claim 5 in which the slit unit comprises a pair of abutting metal blocks each having an end notched to provide a slit in cooperation with the abutting unnotched edge of the other block.

7. Apparatus according to claim 6 in which means are provided in adjusting the width of the slits without disturbing a symmetrical location on the opposite sides of the mandrel axis.

8. Apparatus according to claim 6 in which the source of X-ray and the detectors are affixed to the body member as a common assembly and means are provided to rotate said assembly around the cable to measure the concentricity of its sheath and conductor in any desired plane without interfering with the movement of said cable through the mandrel.

9. Apparatus according to claim 8 in which signal indicator means responsive to the detectors and to the position of its assembly in rotation of its cable are provided to indicate the concentricity of the conductor in the sheath and the plane of measurement of the concentricity so indicated.

10. The method of detecting symmetry or lack of symmetry of location of one bounded body of material within another bounded body of a material of different radiation absorptivity which comprises passing penetrating radiation through both bodies of material divided into two beams of fixed mutual relative incident intensity symmetrically disposed on opposite sides of the center line of symmetry of the enclosing body of material and separately measuring the radiation in said beams after passing through both bodies of material to compare the absorptivity of their respective paths therethrough.

11. The method of detecting symmetry or lack of symmetry of location of the conductor of a sheathed cable with respect to its enclosing sheath which comprises passing X-ray through the sheathed cable divided into two beams of equal intensity symmetrically disposed on opposite sides of the axis of the sheathed cable and separately measuring the X-ray in said beams after passing through the sheathed cable to detect any difference in its residual intensity.

FREDERIC FUA.
ROBERT C. WOODS.

REFERENCES CITED

The following references are of record in the file of this patent:

UNITED STATES PATENTS

| Number | Name | Date |
| --- | --- | --- |
| 2,097,760 | Failla | Nov. 2, 1937 |
| 2,237,811 | Cockrell | Apr. 8, 1941 |
| 2,264,725 | Shoupp | Dec. 2, 1941 |
| 2,298,942 | Hicks | Oct. 13, 1942 |
| 2,301,251 | Capen | Nov. 10, 1942 |
| 2,433,558 | Hurley, Jr. | Dec. 30, 1947 |